US010168449B2

United States Patent
Dow et al.

(10) Patent No.: US 10,168,449 B2
(45) Date of Patent: Jan. 1, 2019

(54) CORRECTING COMPUTER MODEL WEATHER FORECASTS USING A HYBRID ANALOG METHOD WITH DYNAMIC TIME WARPING

(71) Applicant: International Business Machines Corporation, Armonk, NY (US)

(72) Inventors: Eli M. Dow, Wappingers Falls, NY (US); Campbell D. Watson, Brooklyn, NY (US); Jessie Yu, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 118 days.

(21) Appl. No.: 15/236,740

(22) Filed: Aug. 15, 2016

(65) Prior Publication Data

US 2018/0045855 A1    Feb. 15, 2018

(51) Int. Cl.
   *G01W 1/10*    (2006.01)
(52) U.S. Cl.
   CPC .................... *G01W 1/10* (2013.01)
(58) Field of Classification Search
   None
   See application file for complete search history.

(56) References Cited

U.S. PATENT DOCUMENTS

| | | | |
|---|---|---|---|
| 5,737,486 A | 4/1998 | Iso | |
| 7,480,640 B1 | 1/2009 | Elad et al. | |
| 9,857,778 B1 * | 1/2018 | Khabibrakhmanov | G05B 13/026 |
| 2013/0024029 A1 * | 1/2013 | Tran | A61B 5/7267 700/278 |
| 2013/0024170 A1 | 1/2013 | Dannecker et al. | |
| 2014/0058572 A1 | 2/2014 | Stein et al. | |
| 2018/0031735 A1 * | 2/2018 | Cipriani | G01W 1/10 |

(Continued)

FOREIGN PATENT DOCUMENTS

| | | | |
|---|---|---|---|
| CN | 103577890 A | | 2/2014 |
| CN | 104850740 A | * | 8/2015 |
| CN | 104240541 B | * | 1/2016 |

OTHER PUBLICATIONS

English machine translation of CN-104240541-B, published Jan. 27, 2016 (Year: 2016).*

(Continued)

*Primary Examiner* — David M. Gray
*Assistant Examiner* — Geoffrey T Evans
(74) *Attorney, Agent, or Firm* — Cantor Colburn LLP (57) ABSTRACT

An aspect receiving a new weather forecast. A temporally coherent analog modeling process is performed to identify a historical weather forecast that matches the new weather forecast. The new weather forecast is updated based on historical weather observations at points in time in the historical weather forecast. The updating includes: shifting a point in time in the historical weather forecast based on a factor determined by a previously executed dynamic time warping (DTW) of the historical weather forecast and the historical weather observations; and modifying the new weather forecast based on the historical weather observations at the shifted point in time. The updated new weather forecast is output.

20 Claims, 3 Drawing Sheets

(56) References Cited

U.S. PATENT DOCUMENTS

2018/0038994 A1* 2/2018 Hamann ................ G01W 1/06

OTHER PUBLICATIONS

English machine translation of CN104850740A, published Aug. 19, 2015; Inventors: Sun et al. (Year: 2015).*
Kira Radinsky, "Learning to Predict the Future Using Web Knowledge and Dynamics", Technion—Computer Science Departemnt—PhD Thesis, Dec. 2012, 238 pages.

* cited by examiner

CORRECTING COMPUTER MODEL WEATHER FORECASTS USING A HYBRID ANALOG METHOD WITH DYNAMIC TIME WARPING

BACKGROUND

The present invention relates to computer model weather forecasts, and more specifically, to correcting computer model weather forecasts using a hybrid analog method with dynamic time warping.

Weather forecasting is the application of science and technology to predict the state of the atmosphere for a given location. Human beings have attempted to predict the weather informally for millennia, and formally since the nineteenth century. Weather forecasts are made by collecting quantitative data about the current state of the atmosphere at a given place and using scientific understanding of atmospheric processes to project how the atmosphere will change.

Once an all-human endeavor based mainly upon changes in barometric pressure, current weather conditions, and sky condition, weather forecasting now relies on computer-based models that take many atmospheric factors into account. Human input is still required to pick the best possible forecast model to base the forecast upon, which involves pattern recognition skills, teleconnections, knowledge of model performance, and knowledge of model biases. The inaccuracy of forecasting is due to the chaotic nature of the atmosphere, the massive computational power required to solve the equations that describe the atmosphere, the error involved in measuring the initial conditions, and an incomplete understanding of atmospheric processes. Hence, forecasts become less accurate as the difference between current time and the time for which the forecast is being made (the range of the forecast) increases. The use of ensembles and model consensus help narrow the error and pick the most likely outcome.

When forecasting weather events from computer models, time series data is one way of representing the forecasted parameter, or feature, over time. However, computer models often have bias or do not fit observations. Some models get the magnitude of the events correct but they may be temporally off, for instance predicting the right amount of rain but not in the appropriate time window (perhaps predicting a storm will move in later or earlier than it actually does).

SUMMARY

Embodiments include a method, system, and computer program product for correcting computer model weather forecasts using a hybrid analog method with dynamic time warping. A method includes receiving a new weather forecast. A temporally coherent analog modeling process is performed to identify a historical weather forecast that matches the new weather forecast. The new weather forecast is updated based on historical weather observations at points in time in the historical weather forecast. The updating includes: shifting a point in time in the historical weather forecast based on a factor determined by a previously executed dynamic time warping (DTW) of the historical weather forecast and the historical weather observations; and modifying the new weather forecast based on the historical weather observations at the shifted point in time. The updated new weather forecast is output.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Weather forecast models often produce accurate predictions about the shape and magnitude of upcoming weather events yet these predictions may be shifted in time or space. Embodiments described herein can be used to dynamically correct weather forecasts for these shifts using a hybrid analog method with dynamic time warping (DTW). In accordance with one or more embodiments, a time series forecasting technique of analog replacement is utilized, however instead of replacing the future forecasted value with an observation that corresponds directly in time to the similar historically predicted forecasted value, a DTW observation is used to dynamically correct for temporal anomalies. In this manner, both magnitude and temporal corrections are made to a weather forecast based on observed data.

Analog modeling is a mathematical technique for determining a surrogate value to use in lieu of a forecasted value based on similarity of the forecasted value to some previously encountered patterns (be they magnitude, general shape, or temporal) jn forecasted value(s). When the most similar historical forecast value(s) is found where an actual observation was known to exist, the forecast is corrected by substituting the observation(s) that corresponds in time to the matching forecasted value. The analog method can be used to determine, for example, that a particular feature (e.g., wind speed, rainfall intensity, and temperature) is historically over or under predicted. Thus, analog modeling identifies values of existing features on a weather chart that resemble those that occurred in the past (e.g., performs pattern recognition), and then uses the previous weather events to guide the new forecast. Analog modeling can generally be used to correct for magnitude errors but it does not always be assumed to correct for temporal errors. In some cases it may, such as a uniform time shift throughout the data series, but it cannot be relied upon in all cases of temporal mismatch between model output and observations especially in nonlinear and non-uniform temporal shifts between time series. Thus, the analog model can be referred to as being temporally coherent.

DTW is a mathematical technique for finding an optimal mapping of one time series signal into another. In time series analysis, DTW is an algorithm for measuring similarity between two temporal sequences which may vary in speed. For instance, similarities in time series observations from a storm could be detected using DTW, even if one weather storm was moving faster than the other, or if there were accelerations and decelerations during the course of an observation. In general, DTW is a method that calculates an optimal match between two given sequences (e.g., time series) with certain restrictions. The sequences are warped non-linearly in the time dimension to determine a measure of their similarity independent of certain non-linear variations in the time dimension.

In one or more embodiments described herein, weather forecasts are computed, and observations spanning the forecasts are obtained until a body of forecasted and observed variables spans a sufficient time duration to capture variability in the underlying phenomena being predicted (e.g., diurnal or seasonal or annual durations). Alternatively, observations and hindcasts can be synthesized into overlapping continuous data sets in lieu of perfect coverage of observations and historically generated forecasts that capture the variability. The hindcasts may be generated on demand or come from a previous archive covering the time and place being modeled. In one or more embodiments, a new forecast into the future is generated. The DTW factors represent the mapping of the time series signal representing a feature of the forecast onto the observation time series for the same feature is then computed. An analog method may be computed using sliding windows over both time series. Parameters for analog selection are based on the sliding window (e.g., mean, standard-deviation, variance, delta-y, etc.). Historical sliding windows with the closest values to the forecasted sliding window are located using any heuristic function. An example of a simple heuristic function that can be used is Euclidean distance from the mean, however other more sophisticated analog selection criteria can be used. The dynamically time warped target (observation) that matches the centroid observation from the sliding window selected by the analog selection heuristic function from the historical model can be selected. The forecasted value can then be replaced and/or annotated with this time warped surrogate value for a refined prediction.

Figure 1:
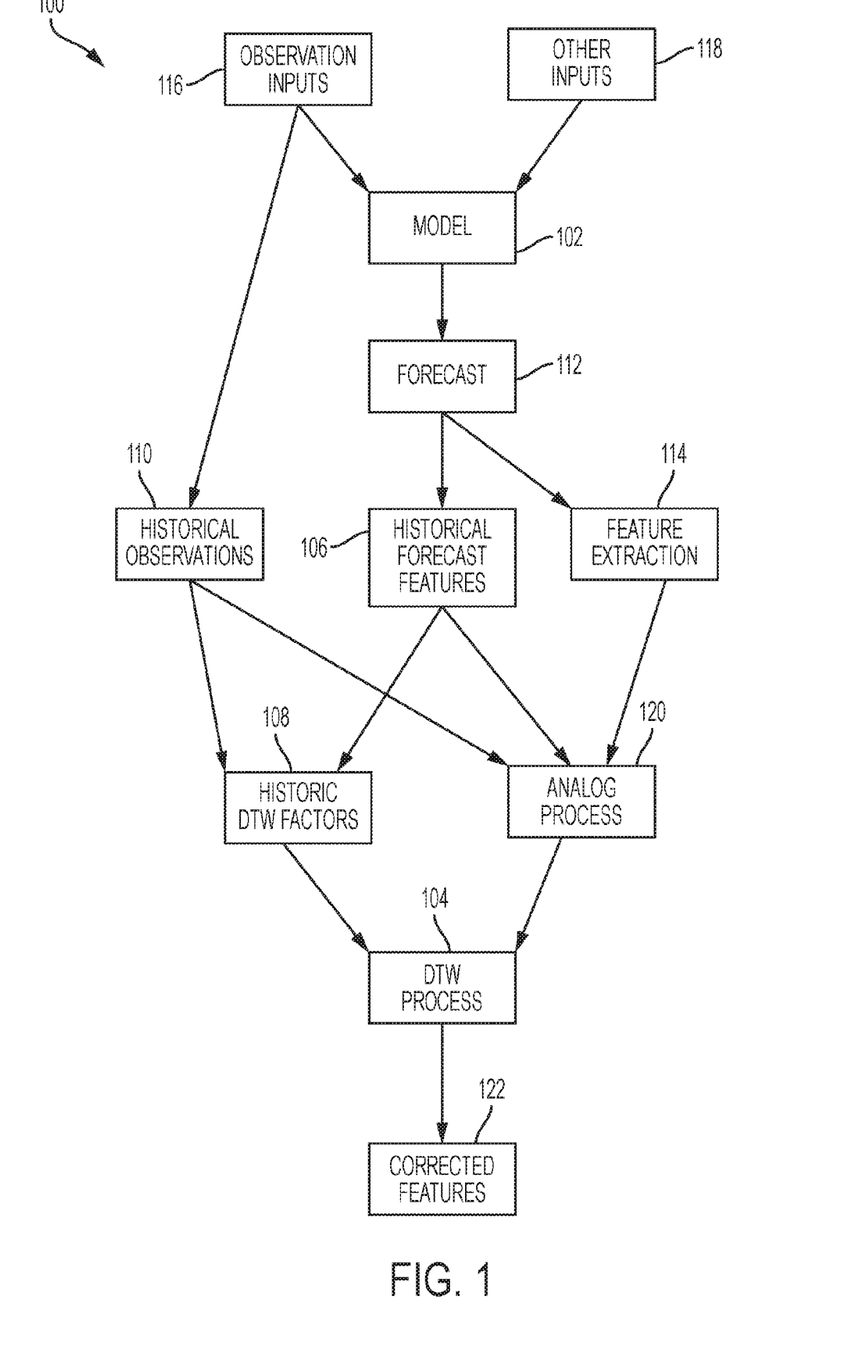
FIG. 1 illustrates components of a system to correct computer model weather forecasts using a hybrid analog method with dynamic time warping (DTW) according to one or more embodiments of the invention.

Turning now to FIG. 1, components of a system 100 to correct computer model weather forecasts using a hybrid analog method with DTW is generally shown according to one or more embodiments. FIG. 1 includes a weather forecast model 102, a feature extraction process 114, an analog process 120, and a DTW process 104, all executing on one or more processors for performing the processing described herein. As shown in FIG. 1, the weather forecast model 102 can generate a forecast 112 based on observation inputs 116 and other inputs 118. Observation inputs 116 can include, but are not limited to air temperature observations, wind speed observations, or aerosol optical depth observations. As shown in FIG. 1, the observation inputs 116 can be stored in a historical observations database 110. Other inputs 118 can include, but are not limited to the estimated values of air temperature or wind speed from an independent process in places where observations do not exist. Any known weather forecasting model 102 can be utilized to generate a new weather forecast 112 such as, but not limited to European Center for Medium-Range Weather Forecasting (ECMWF), and the Model for Prediction Across Scales (MPAS). In one or more embodiments, the new weather forecast 112 is represented as time series data.

The components shown in FIG. 1 include the historical forecast database 106, a historic DTW factor database 108, and a historical observation database 110. In one or more embodiments, the historical forecast features database 106 includes a set of historical weather forecasts that were generated by the weather forecast model 102 for a given geographical area; and the historical observation database 110 includes a set of historical weather observations that correspond to the set of historical weather forecasts. As shown in FIG. 1 the new forecast 112 is stored in the historical forecast features database 106 and values of features of interest are extracted from the forecast 112 by the feature extraction process 114. Any subset of features may be extracted from the forecast that may need to be used with downstream models, or for use with DTW, analog methods, or further post processing of a single model output variable. In many embodiments, users may opt to extract all possible features, while others may extract only a few key features of importance to their business processes. Examples of features include, but are not limited to: rain amount, wind speed, humidity, temperature, and wind direction.

As shown in FIG. 1, in accordance with one or more embodiments, the features extracted from the new forecast 112 are updated (corrected) using an analog process 120. The analog modeling process 120 can be implemented by any known forecasting model such as, but not limited to the previously mentioned ECMWF and MPAS models. Features can be corrected by the analog process 120 individually or as a group. As shown in FIG. 1, in one or more embodiments, the analog modeling process 120 is modified (or added to) by a DTW process 104 in order to take into account temporal adjustments as described herein.

The DTW process 104 shown in FIG. 1 is used to generate the historical DTW factors 108 based on historical weather forecasts in the historical forecast features database 106 and their corresponding historical weather observations in the historical observation database 110. In one or more embodiments, the DTW process 104 is executed in the background each time that a new weather forecast and corresponding weather observation are added to the historical forecast feature database 106 and the historical observation database 110. The DTW process 104 adjusts the time correlations between the historical weather forecast and the historical weather observations. The adjusted time correlations are stored as historical DTW factors in the historic DTW factors database 108. The DTW process 104 can be implemented by algorithms such as, but not limited to those shown in the examples below. As shown in FIG. 1, corrected features 122 are output from the DTW process 104. These corrected features 122 make up an updated new weather forecast that has been corrected for magnitude and time.

Following is an example of an implementation of the DTW algorithm that may be utilized by one or more embodiments. In this example, two sequences s and t are strings of discrete symbols. In addition, for the two symbols x and y, d(x,y) is a distance between the symbols (e.g., $d(x,y)=|x-y|$):

```
int DTWDistance(s: array [1..n], t: array [1..m]) {
    DTW := array [0..n, 0..m]
        for i := 1 to n
            DTW[i, 0] := infinity
        for i := 1 to m
            DTW[0, i] := infinity
        DTW[0, 0] := 0
        for i := 1 to n
```

-continued

```
        for j := 1 to m
            cost := d(s[i], t[j])
            DTW[i, j] := cost + minimum(DTW[i-1, j], // insertion
                DTW[i , j], // deletion
                DTW[i-1, j-1]) // match
        return DTW[n, m]
}
```

In one or more other embodiments, a locality constraint can be added. That is, it is required that if s[i] is matched with t[j], then |i−j| is no larger than w, a window parameter. The above algorithm can be modified to add a locality constraint (differences marked below in italics). However, the modification works only if |n−m| is no larger than w (i.e., the end point is within the window length from diagonal). In order to make the algorithm work, the window parameter w must be adapted so that |n−m|<=w (see the line marked with (*) in the code below).

```
    int DTWDistance(s: array [1..n], t: array [1..m], w: inf) {
        DTW := array [0..n, 0..m]
        w := max(w, abs(n−m)) // adapt window size (*)
        for i := 0 to n
            for j := 0 to m
                DTW[i, j] := infinity
        DTW[0, 0] := 0
        for i := 1 to n
            for j := max(1, i−w) to min(m, i+w)
                cost := d(s[i], t[j])
                DTW[i, j] := cost + minimum(DTW[i-1, j], // insertion
                    DTW[i, j-1], // deletion
                    DTW[i-1, j-1]) // match
        return DTW[n, m]
    }
```

Figure 2:
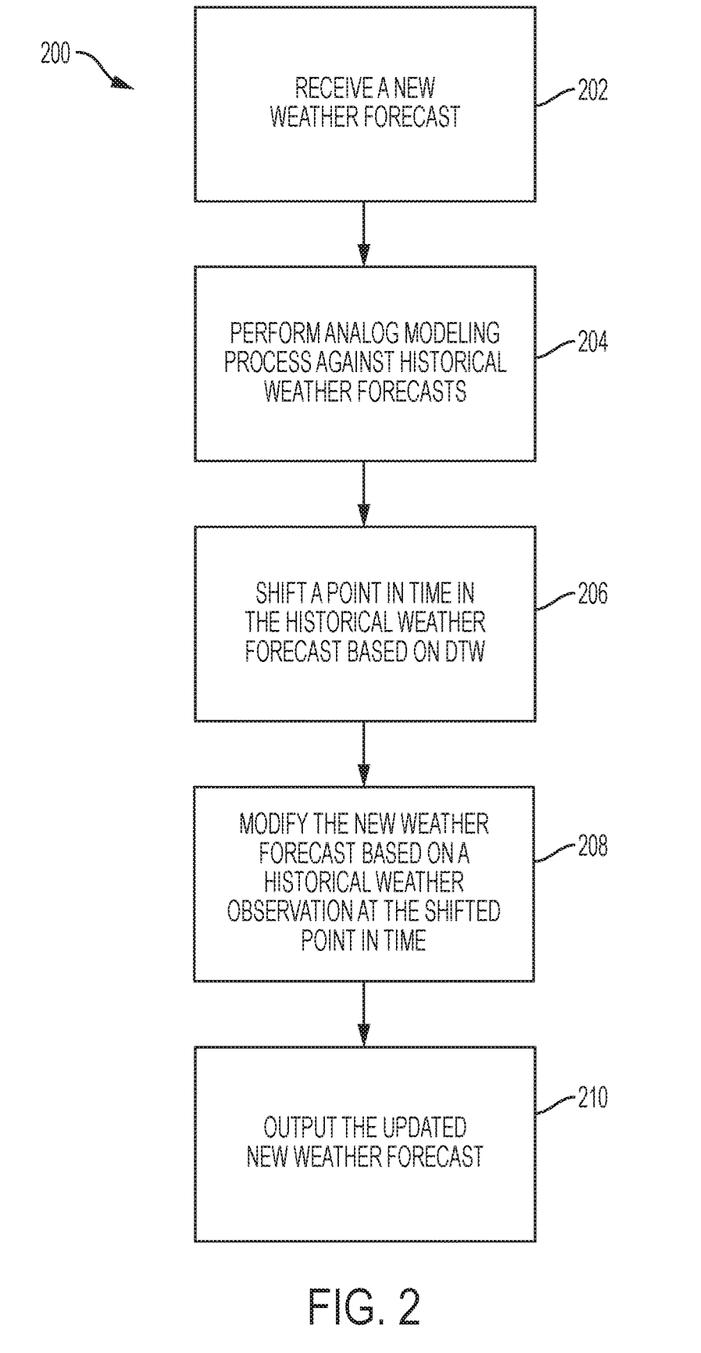
FIG. 2 illustrates a flow diagram for correcting computer model weather forecasts using a hybrid analog method with DTW according to one or more embodiments of the invention.

Turning now to FIG. 2, a flow diagram 200 for correcting computer model forecasts using a hybrid analog method with DTW is generally shown according to one or more embodiments. The process shown in FIG. 2 can be implemented by the weather forecast model 102 shown in FIG. 1 executing on a computer system such as that shown in FIG. 3 below. At block 202, a new weather forecast is received. In one or more embodiments, the new weather forecast is generated based on a computer model and the forecasted parameter(s) is represented as time series data to predict values of the parameter(s) at points in time in the future. In one or more embodiments, the processing shown in FIG. 2 includes running a weather forecast model to produce the new weather forecast.

At block 204, a temporally coherent analog modeling process is performed to identify a historical weather forecast that matches the new weather forecast. As used herein, the term "temporally coherent" describes the correlation between one or more time series signals observed at different moments in time. If two events occur, or will occur, simultaneously they are said to have high levels of, or perfect temporal coherence.

In one or more embodiments the new weather forecast covers the same geographic area as the historical weather forecast. In one or more embodiments of the analog modeling process, the new weather forecast and the historical weather forecast include data where the feature(s) being forecasted is plotted in a graph, with the y-axis representing a value of the feature and the x-axis representing time. The analog modeling process includes finding similarities (e.g., in shape) between the new weather forecast and the historical weather forecast. The historical weather forecast is said to "match" the new weather forecast when the two series have, for example, high auto-correlation and mean values over sliding windows throughout the series or across the series as a whole. Based on detecting a match, future points in time in the new weather forecast are correlated with points in time in the historical weather forecast.

Processing continues at blocks 206 and 208 where the new weather forecast is updated based on historical weather observations at points in time in the historical weather forecast. As described previously, when a historical weather forecast and its corresponding historical weather observations are added to the model, DTW is performed to adjust the time correlations between the historical weather forecast and the historical weather observations. The adjusted time correlations are stored as historical DTW factors. At block 206, a point in time in the historical weather forecast is shifted based on the DTW factor that was determined by a previously executed DTW of the historical weather forecast and the historical weather observations. In one or more embodiments, the DTW of the historical weather forecast and the historical weather observations is performed between blocks 204 and 206. At block 208, the new weather forecast is modified based on a historical weather observation at the shifted point in time.

An example of updating the new weather forecast based on historical weather observations at points in time in the historical weather forecast follows. For example, a future point in time in the new weather forecast, NWFT1, may correspond to a point in time in the historical weather forecast, HWFT1, and the DTW factor for time HWFT1 is "+30 minutes." In this example, the value of the feature(s) at time "HWFT1+30 minutes" in the historical weather observations is substituted into the new weather forecast at time NWFT1. Thus, the updated new weather forecast includes corrections for both magnitude and temporal variances between historical weather forecasts and historical weather observations.

In one or more embodiments, different points in time, representing different features from the historical weather forecast may correspond to different DTW factors. The DTW factors for the same historical weather forecast can be non-linear, with one DTW factor appearing to have no apparent relation to another DTW factor. In addition the DTW factors can be expressed in any mathematical manner and are not limited to addition as shown in the example above.

In one or more embodiments, the new weather forecast predicts values for one feature at a future point(s) in time. In one or more other embodiments, the new weather forecast predicts values for a combination of features at a future point(s) in time.

At block 210, the updated new weather forecast is output. The updated new weather forecast can be utilized by a number of different business sectors with their own specific needs for weather forecasts. One or more embodiments can be utilized by the air traffic or aviation industry. Because the aviation industry is especially sensitive to the weather, accurate weather forecasting is essential. Fog or exceptionally low ceilings can prevent many aircraft from landing and taking off. Turbulence and icing can also be significant in-flight hazards. Thunderstorms are a problem for all aircraft because of severe turbulence due to their updrafts and outflow boundaries, icing due to the heavy precipitation, as well as large hail, strong winds, and lightning, all of which can cause damage to an aircraft in flight. On a day-to-day basis airliners are routed to take advantage of the jet stream tailwind to improve fuel efficiency. Aircrews are briefed prior to takeoff on the conditions to expect in route and at their destination. Additionally, airports often change which runway is being used to take advantage of a headwind. This reduces the distance required for takeoff, and eliminates potential crosswinds.

One or more embodiments can be utilized in the marine sector. Commercial and recreational use of waterways can be limited significantly by wind direction and speed, wave periodicity and heights, tides, and precipitation. These factors can each influence the safety of marine transit. Consequently, a variety of codes have been established to efficiently transmit detailed marine weather forecasts to vessel pilots via radio.

In addition, one or more embodiments can be utilized in the agriculture sector. Farmers rely on weather forecasts to decide what work to do on any particular day. For example, drying hay is only feasible in dry weather. Prolonged periods of dryness can ruin cotton, wheat, and corn crops. While corn crops can be ruined by drought, their dried remains can be used as a cattle feed substitute in the form of silage. Frosts and freezes can play havoc with crops both during the spring and fall. For example, peach trees in full bloom can have their potential peach crop decimated by a spring freeze.

Further, one or more embodiments can be utilized by utility companies. Electricity and gas companies rely on weather forecasts to anticipate demand which can be strongly affected by the weather. They use the quantity termed the degree day to determine how strong of a use there will be for heating (heating degree day) or cooling (cooling degree day). In winter, severe cold weather can cause a surge in demand as people turn up their heating. Similarly, in summer a surge in demand can be linked with the increased use of air conditioning systems in hot weather. By anticipating a surge in demand, utility companies can purchase additional supplies of power or natural gas before the price increases.

Figure 3:
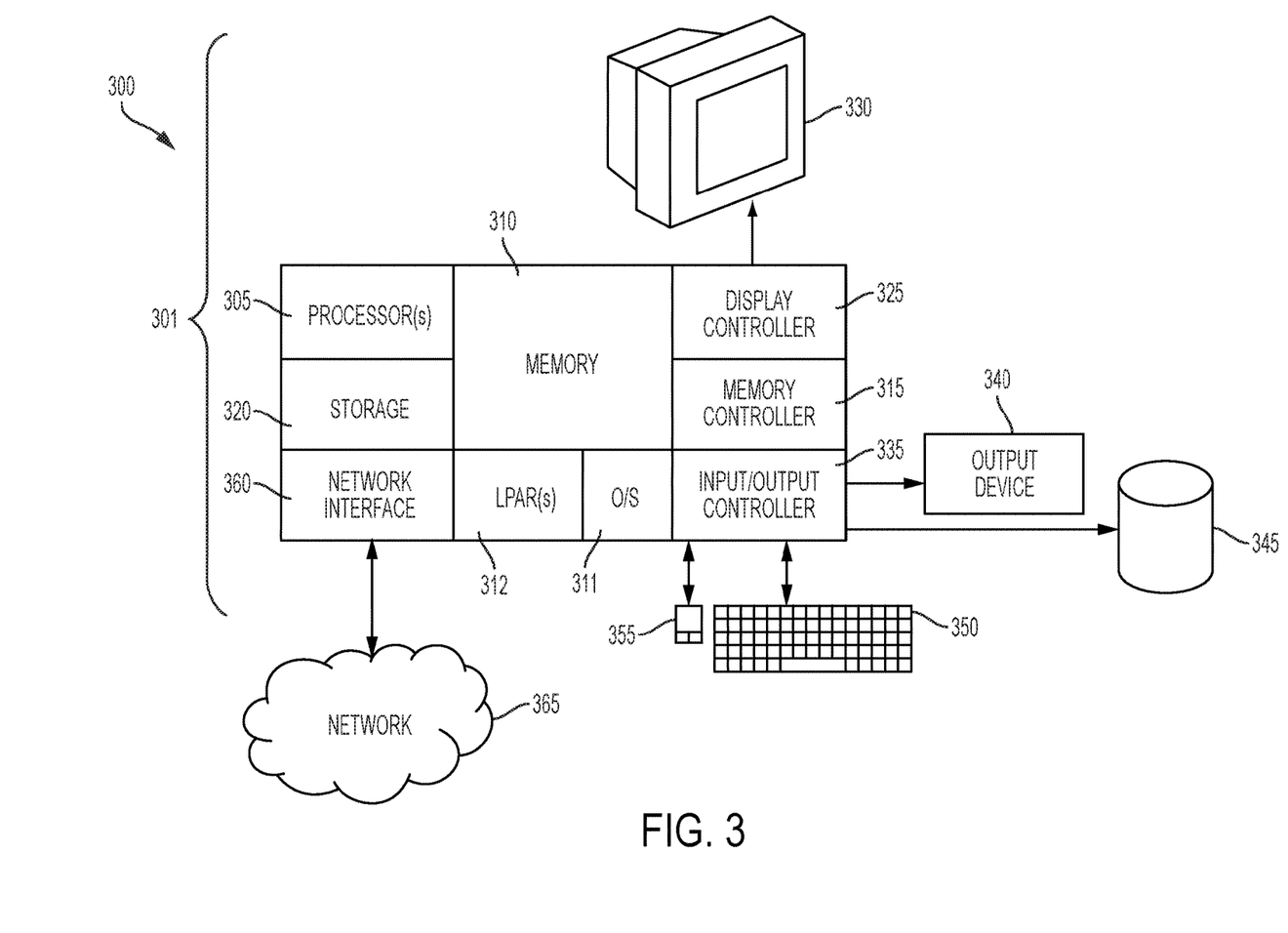
FIG. 3 illustrates a computer system for correcting computer model weather forecasts using a hybrid analog method with DTW according to one or more embodiments of the invention.

Turning now to FIG. 3, a computer system for correcting computer model forecasts using a hybrid analog method with DTW is generally shown according to one or more embodiments. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 300 therefore may include general-purpose computer or mainframe 301 capable of running multiple instances of an O/S simultaneously.

In an exemplary embodiment, in terms of hardware architecture, as shown in FIG. 3, the computer 301 includes one or more processors 305, memory 310 coupled to a memory controller 315, and one or more input and/or output (I/O) devices 340, 345 (or peripherals) that are communicatively coupled via a local input/output controller 335. The input/output controller 335 can be, for example but not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 335 may include a plurality of sub-channels configured to access the output devices 340 and 345. The sub-channels may include fiber-optic communications ports.

The processor 305 is a hardware device for executing software, particularly that stored in storage 320, such as cache storage, or memory 310. The processor 305 can be any custom made or commercially available processor, a central processing unit (CPU), an auxiliary processor among several processors associated with the computer 301, a semiconductor based microprocessor (in the form of a microchip or chip set), a macroprocessor, or generally any device for executing instructions.

The memory 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, and/or other types of storage media. Note that the memory 310 can have a distributed architecture, where various components are situated remote from one another, but can be accessed by the processor 305.

The instructions in memory 310 may include one or more separate programs, each of which comprises an ordered listing of executable instructions for implementing logical functions. In the example of FIG. 3, the instructions in the memory 310 a suitable operating system (OS) 311. The operating system 311 essentially controls the execution of other computer programs and provides scheduling, input-output control, file and data management, memory management, and communication control and related services.

The memory 310 may include multiple logical partitions (LPARs) 312, each running an instance of an operating system. The LPARs 312 may be managed by a hypervisor, which may be a program stored in memory 310 and executed by the processor 305.

In an exemplary embodiment, a conventional keyboard 350 and mouse 355 can be coupled to the input/output controller 335. Other output devices such as the I/O devices 340, 345 may include input devices, for example but not limited to a printer, a scanner, microphone, and the like. Finally, the I/O devices 340, 345 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 300 can further include a display controller 325 coupled to a display 330. In an exemplary embodiment, the system 300 can further include a network interface 360 for coupling to a network 365. The network 365 can be an IP-based network for communication between the computer 301 and any external server, client and the like via a broadband connection. The network 365 transmits and receives data between the computer 301 and external systems. In an exemplary embodiment, network 365 can be a managed IP network administered by a service provider. The network 365 may be implemented in a wireless fashion, e.g., using wireless protocols and technologies, such as WiFi, WiMax, etc. The network 365 can also be a packet-switched network such as a local area network, wide area network, metropolitan area network, Internet network, or other similar type of network environment. The network 365 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 301 is a PC, workstation, intelligent device or the like, the instructions in the memory 310 may further include a basic input output system (BIOS) (omitted for simplicity). The BIOS is a set of essential software routines that initialize and test hardware at startup, start the OS 311, and support the transfer of data among the hardware devices. The BIOS is stored in ROM so that the BIOS can be executed when the computer 301 is activated.

When the computer 301 is in operation, the processor 305 is configured to execute instructions stored within the memory 310, to communicate data to and from the memory 310, and to generally control operations of the computer 301 pursuant to the instructions.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving a new weather forecast;
   performing a temporally coherent analog modeling process to identify a historical weather forecast that matches the new weather forecast;
   updating the new weather forecast based on historical weather observations at points in time in the historical weather forecast, the updating comprising:
      shifting a point in time in the historical weather forecast based on a factor determined by a previously executed dynamic time warping (DTW) of the historical weather forecast and the historical weather observations; and
      modifying the new weather forecast based on the historical weather observations at the shifted point in time;
   anticipating a utility demand based on the new weather forecast; and
   purchasing utility supplies based on the utility demand.

2. The method of claim 1, further comprising running the new weather forecast.

3. The method of claim 1, wherein the new weather forecast covers the same geographic area as the historical weather forecast.

4. The method of claim 1, wherein the new weather forecast predicts values for one feature at a future point in time corresponding to the point in time in the historical weather forecast, and the modifying includes substituting a historical weather observation at the shifted point in time into the new weather forecast at the future point in time.

5. The method of claim 1, wherein the new weather forecast predicts values for a combination of features at a future point in time corresponding to the point in time in the historical weather forecast, and the modifying includes substituting a historical weather observation at the shifted point in time into the new weather forecast at the future point in time.

6. The method of claim 1, wherein the temporally coherent analog modeling process matches the historical weather forecast and the new weather forecast based on a shape of a graph of feature values along a time axis.

7. The method of claim 1, further comprising executing the DTW of the historical weather forecast and the historical weather observations subsequent to the performing and prior to the updating.

8. The method of claim 1, wherein the updated new weather forecast includes corrections for both magnitude and temporal variances between historical weather forecasts and historical weather observations.

9. A system comprising:
   a memory having computer readable instructions; and
   a processor for executing the computer readable instructions, the computer readable instructions including:
   receiving a new weather forecast;
   performing a temporally coherent analog modeling process to identify a historical weather forecast that matches the new weather forecast;
   updating the new weather forecast based on historical weather observations at points in time in the historical weather forecast, the updating comprising:
      shifting a point in time in the historical weather forecast based on a factor determined by a previously executed dynamic time warping (DTW) of the historical weather forecast and the historical weather observations; and
      modifying the new weather forecast based on the historical weather observations at the shifted point in time; and
   outputting the updated new weather forecast to a marine vessel pilot.

10. The system of claim 9, wherein the instructions further include running the new weather forecast.

11. The system of claim 9, wherein the new weather forecast covers the same geographic area as the historical weather forecast.

12. The system of claim 9, wherein the new weather forecast predicts values for one feature at a future point in time corresponding to the point in time in the historical weather forecast, and the modifying includes substituting a historical weather observation at the shifted point in time into the new weather forecast at the future point in time.

13. The system of claim 9, wherein the new weather forecast predicts values for a combination of features at a future point in time corresponding to the point in time in the historical weather forecast, and the modifying includes substituting a historical weather observation at the shifted point in time into the new weather forecast at the future point in time.

14. The system of claim 9, wherein the temporally coherent analog modeling process matches the historical weather forecast and the new weather forecast based on a shape of a graph of feature values along a time axis.

15. The system of claim 9, wherein the instructions further include executing the DTW of the historical weather forecast and the historical weather observations subsequent to the performing and prior to the updating.

16. The system of claim 9, wherein the updated new weather forecast includes corrections for both magnitude and temporal variances between historical weather forecasts and historical weather observations.

17. A computer program product comprising a computer readable storage medium having program instructions embodied therewith, the program instructions executable by processing circuitry to cause the processing circuitry to perform:
   receiving a new weather forecast;
   performing a temporally coherent analog modeling process to identify a historical weather forecast that matches the new weather forecast;
   updating the new weather forecast based on historical weather observations at points in time in the historical weather forecast, the updating comprising:
      shifting a point in time in the historical weather forecast based on a factor determined by a previously executed dynamic time warping (DTW) of the historical weather forecast and the historical weather observations; and
      modifying the new weather forecast based on the historical weather observations at the shifted point in time;
   outputting the updated new weather forecast; and
   selecting a runway for an aircraft at an airport based on the new weather forecast.

18. The computer program product of claim 17, wherein the new weather forecast predicts values for one feature at a future point in time corresponding to the point in time in the historical weather forecast, and the modifying includes substituting a historical weather observation at the shifted point in time into the new weather forecast at the future point in time.

19. The computer program product of claim 17, wherein the new weather forecast predicts values for a combination of features at a future point in time corresponding to the point in time in the historical weather forecast, and the modifying includes substituting a historical weather observation at the shifted point in time into the new weather forecast at the future point in time.

20. The computer program product of claim 17, wherein the updated new weather forecast includes corrections for both magnitude and temporal variances between historical weather forecasts and historical weather observations.

\* \* \* \* \*